United States Patent
Ram et al.

(10) Patent No.: US 11,401,426 B1
(45) Date of Patent: Aug. 2, 2022

(54) COMPOSITE CONDUCTING POLYMER FILMS

(71) Applicant: UNIVERSITY OF SOUTH FLORIDA, Tampa, FL (US)

(72) Inventors: Manoj Kumar Ram, Palm Harbor, FL (US); Elias K. Stefanakos, Tampa, FL (US); Yogi D. Goswami, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 605 days.

(21) Appl. No.: 15/161,541

(22) Filed: May 23, 2016

Related U.S. Application Data (60) Provisional application No. 62/165,379, filed on May 22, 2015.

(51) Int. Cl.
| | |
|---|---|
| *C09D 5/24* | (2006.01) |
| *C09D 165/00* | (2006.01) |
| *G01N 19/10* | (2006.01) |
| *C25D 9/02* | (2006.01) |
| *C25D 17/12* | (2006.01) |
| *C25D 17/10* | (2006.01) |

(52) U.S. Cl.
CPC ............. *C09D 5/24* (2013.01); *C09D 165/00* (2013.01); *C25D 9/02* (2013.01); *C25D 17/10* (2013.01); *C25D 17/12* (2013.01); *G01N 19/10* (2013.01)

(58) Field of Classification Search
None
See application file for complete search history.

(56) References Cited

U.S. PATENT DOCUMENTS

| | | | | |
|---|---|---|---|---|
| 4,560,534 A | * | 12/1985 | Kung | C12Q 1/006 422/82.02 |
| 4,569,734 A | * | 2/1986 | Naarmann | C08F 34/00 205/76 |
| 7,916,455 B2 | * | 3/2011 | Yoshida | C08G 61/124 361/516 |
| 8,455,043 B2 | * | 6/2013 | Chang | B82Y 10/00 427/122 |
| 2005/0176592 A1 | * | 8/2005 | Calvo | C09D 5/24 508/128 |
| 2011/0061612 A1 | * | 3/2011 | Haase | F01K 25/005 123/3 |
| 2012/0043007 A1 | * | 2/2012 | Malik, Jr. | H01L 21/67132 156/64 |

(Continued)

FOREIGN PATENT DOCUMENTS

WO    WO1997004464 A1    2/1997

OTHER PUBLICATIONS

Okuzaki, et al. Theoretical Study of Sorption-Induced Bending of Polypyrrole Films; Journal of Polymer Science; Jul. 1997.

(Continued)

*Primary Examiner* — Kevin R Kruer
(74) *Attorney, Agent, or Firm* — Quarles & Brady LLP; Yakov Sidorin (57) ABSTRACT

In one embodiment, a flexible composite conducting polymer film includes a composite conducting polymer including a conducting polymer and one or more water-soluble polyanions, wherein the film is approximately 20 nanometers to 10 microns thick.

10 Claims, 11 Drawing Sheets

(56) References Cited

U.S. PATENT DOCUMENTS

2013/0334467 A1* 12/2013 Zhou .................. H01G 11/36
 252/500
2014/0125196 A1 5/2014 Ma et al.

OTHER PUBLICATIONS

Okuzaki, et al., Temperature Dependence of humido-responsive bending of conducing polymer films; Elsevier; Science Direct; , 2005.
Okuzaki, et al., Humidity Sensitive Polypyrrole Films for Electro-Active Polymer Actuators; Advanced Functional Materials; 2013.
M. Ma, L. Guo, D. G. Anderson, and R. Langer, "Bio-inspired polymer composite actuator and generator driven by water gradients," Science, vol. 339, pp. 186-189, 2013.
C. Lin, B. Hwang, and C. Lee, "Characteristics and sensing behavior of electrochemically codeposited polypyrrole-poly (vinyl alcohol) thin film exposed to ethanol vapors," Journal of applied polymer science, vol. 73, pp. 2079-2087, 1999.
C. Lin, B. Hwang, and C. Lee, "Sensing behaviors of the electrochemically co-deposited polypyrrole-poly (vinyl alcohol) thin film exposed to ammonia gas," Materials Chemistry and physics, vol. 58, pp. 114-120, 1999.
E. Andreoli, D. A. Rooney, W. Redington, R. Gunning, and C. B. Breslin, "Electrochemical Deposition of Hierarchical Micro/Nanostructures of Copper Hydroxysulfates on Polypyrrole—Polystyrene Sulfonate Films," The Journal of Physical Chemistry C, vol. 115, pp. 8725-8734, 2011.
C. M. Elliott, A. B. Kopelove, W. J. Albery, and Z. Chen, "Nonaqueous electrochemistry of polypyrrole/polystyrenesulfonate composite films: voltammetric, coulometric, EPR, and ac impedance studies," The Journal of Physical Chemistry, vol. 95, pp. 1743-1747, 1991.
A. Saraç, B. Ustamehmetoglu, E. Sezer, and C. Erbil, "The effects of polyacrylic acid/polypyrrole composite coating on photocorrosion and photoactivity of pyrite electrodes," Turkish Journal of Chemistry, vol. 20, pp. 80-87, 1996.
G. Elyashevich, E. Y. Rosova, D. Andreeva, G. Polotskaya, M. Trchová, and Z. Pientka, "New composite systems on the base of polyethylene porous films covered by polypyrrole and polyacrylic acid," Journal of applied polymer science, vol. 97, pp. 1410-1417, 2005.
Y. Yang, C. Wang, B. Yue, S. Gambhir, C. O. Too, and G. G. Wallace, "Electrochemically synthesized polypyrrole/graphene composite film for lithium batteries," Advanced Energy Materials, vol. 2, pp. 266-272, 2012.
P. Si, S. Ding, X.-W. D. Lou, and D.-H. Kim, "An electrochemically formed three-dimensional structure of polypyrrole/graphene nanoplatelets for high-performance supercapacitors," RSC Advances, vol. 1, pp. 1271-1278, 2011.
C. Bora and S. Dolui, "Fabrication of polypyrrole/graphene oxide nanocomposites by liquid/liquid interfacial polymerization and evaluation of their optical, electrical and electrochemical properties," Polymer, vol. 53, pp. 923-932, 2012.
M. Deng, X. Yang, M. Silke, W. Qiu, M. Xu, G. Borghs, et al., "Electrochemical deposition of polypyrrole/graphene oxide composite on microelectrodes towards tuning the electrochemical properties of neural probes," Sensors and Actuators B: Chemical, vol. 158, pp. 176-184, 2011.
A. Kassim, Z. Zainal, W. M. M. Yunus, M. S. Husin, D. Kuang, A. H. Abdullah, et al., "Composites of conducting polymer: Preparation and Characterization," Solid State Science and Technology, vol. 12, pp. 29-35, 2004.
Elliott, et al., "Nonaqueous Electrochemistry of Polypyrrole/Polystyrenesulfonate Composite Films; Voltammetric, Coulometric, EPR, and AC Impedance Studies", J. Phys. Chem, 1991, 95, 1743-1747.
H. Muramatsu, X. Ye, M. Suda, T. Sakuhara, and T. Ataka, "In-situ monitoring of microrheology on electrochemical deposition using an advanced quartz crystal analyzer and its application to polypyrrole deposition," Journal of Electroanalytical Chemistry, vol. 322, pp. 311-323, 1992.

\* cited by examiner

| | |
|---|---|
| Sodium p-toluenesulfonate (PTS) | |
| Poly(styrene p-styrene sulfonate) (PSS) | |
| Polyvinyl alcohol (PVA) | |
| Polyacrylic acid (PAA) | |
| Polyol(pentaerythritol ethoxylate) (PE) | |
| Polyaniline (PANI) | |

FIG. 1A

| | |
|---|---|
| Polyethylene dioxythiophene (PEDOT) | |
| Poly(dimethyl ammonium chloride) (PDMA) | |
| Poly(acryl amino methyl propane sulfonic acid) (PAMPS) | |
| Sodium salt of polymethacrylic acid (NaPMA) | |
| Sodium salt of poly(L-lysine citramide imide) (NaPLCAI) | |

COMPOSITE CONDUCTING POLYMER FILMS

CROSS-REFERENCE TO RELATED APPLICATION

This application claims priority to U.S. Provisional Application Ser. No. 62/165,379, filed May 22, 2015, which is hereby incorporated by reference herein in its entirety.

BACKGROUND

Conducting polymers have been used to create humidity sensors. For example, Ma et al. have recently shown rapid and continuous expansion and contraction of a polypyrrole (PPY) film containing polyol-borate when the film is exposed to humid air. The PPY film is electrochemically developed in the presence of polyol(pentaerythritol ethoxylate)-borate complex with the PPY monomer (i.e., the pyrrole monomer). Later, the composite PPY-polyol-borate was electrochemically reduced (i.e., undoped). In addition, Okuzaki et al. have recently shown bending of PPY films synthesized in non-aqueous media having dopants, such as perchlorate and tetrafluoroborate ions, when the film is exposed to humid air.

While these films may be viable for use in developing humidity sensors, the methods used to create them are disadvantageous. For example, the fabrication process used by Ma et al. is relatively difficult and requires undoping, and Okuzaki et al.'s process requires the use of non-aqueous solvents. It can therefore be appreciated that it would be desirable to have alternative conducting polymer films, as well as alternative methods for making them.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have alternative conducting polymer films and alternative methods for making them. Disclosed herein are examples of such films and methods. In some embodiments, a flexible, composite conducting polymer film is made of a composite polymer that is formed using a conducting polymer, such as polypyrrole (PPY), and one or more water-soluble polyanions. In some embodiments, the composite polymer comprises another component, such as graphene or molybdenum disulfide ($MoS_2$). The various components of the composite polymer can be mixed together in an aqueous solution and electrochemically deposited on a conductive substrate. Once the composite conducting polymer film has been formed, it can be transferred to a flexible, non-metallic substrate, if desired. Unlike prior art processes, no undoping is required and no non-aqueous solvents are necessary. The fabricated composite conducting polymer can be used in various applications, including use in humidity sensors.

In the following disclosure, various specific embodiments are described. It is to be understood that those embodiments are example implementations of the disclosed inventions and that alternative embodiments are possible. All such embodiments are intended to fall within the scope of this disclosure.

Figure 1A:
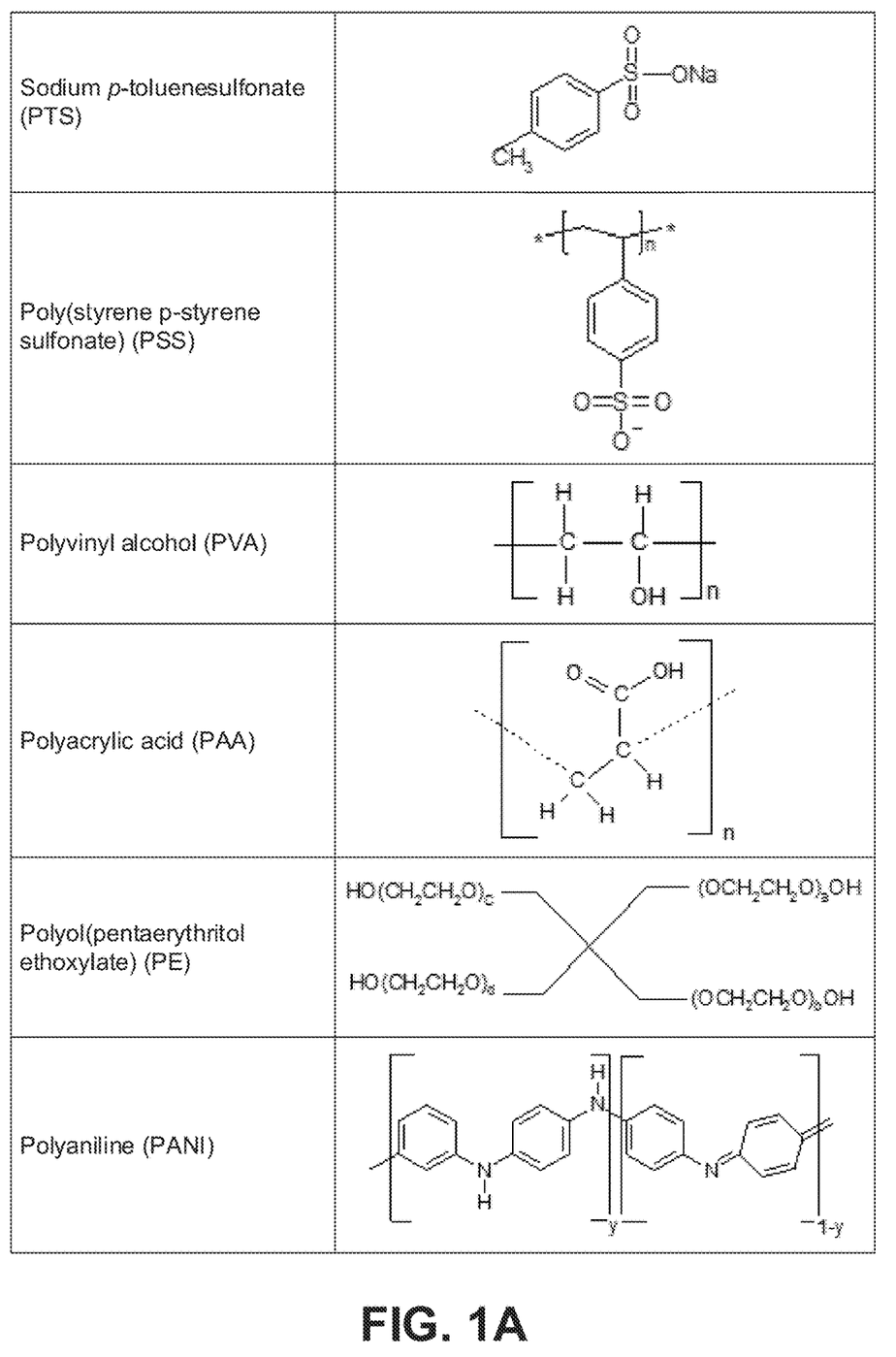
FIGS. 1A-1C list multiple water-soluble polyanions that can be combined with a conducting polymer, such as polypyrrole (PPY), to form composite conducting polymer films.
Figure 1B:
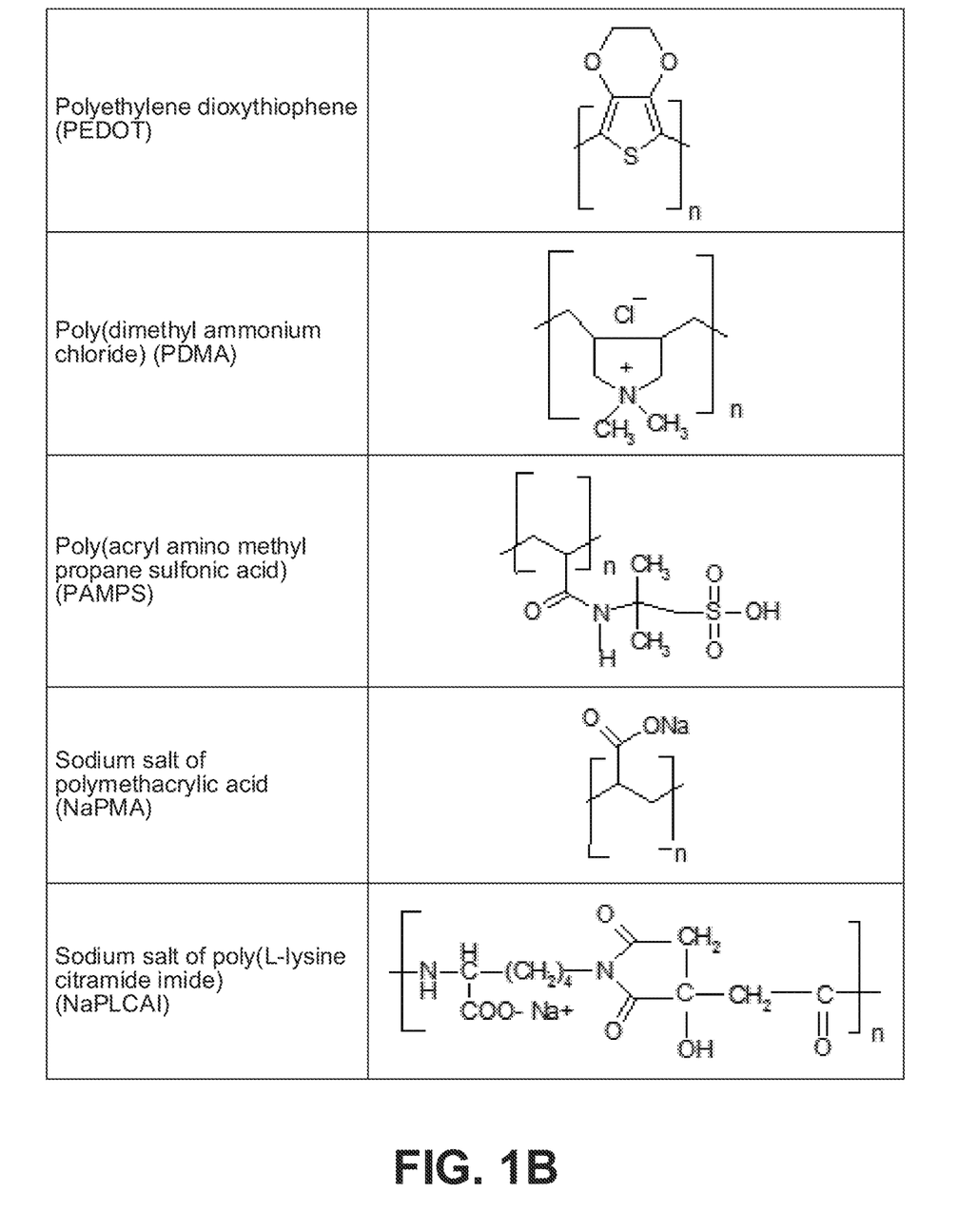
Figure 1C:
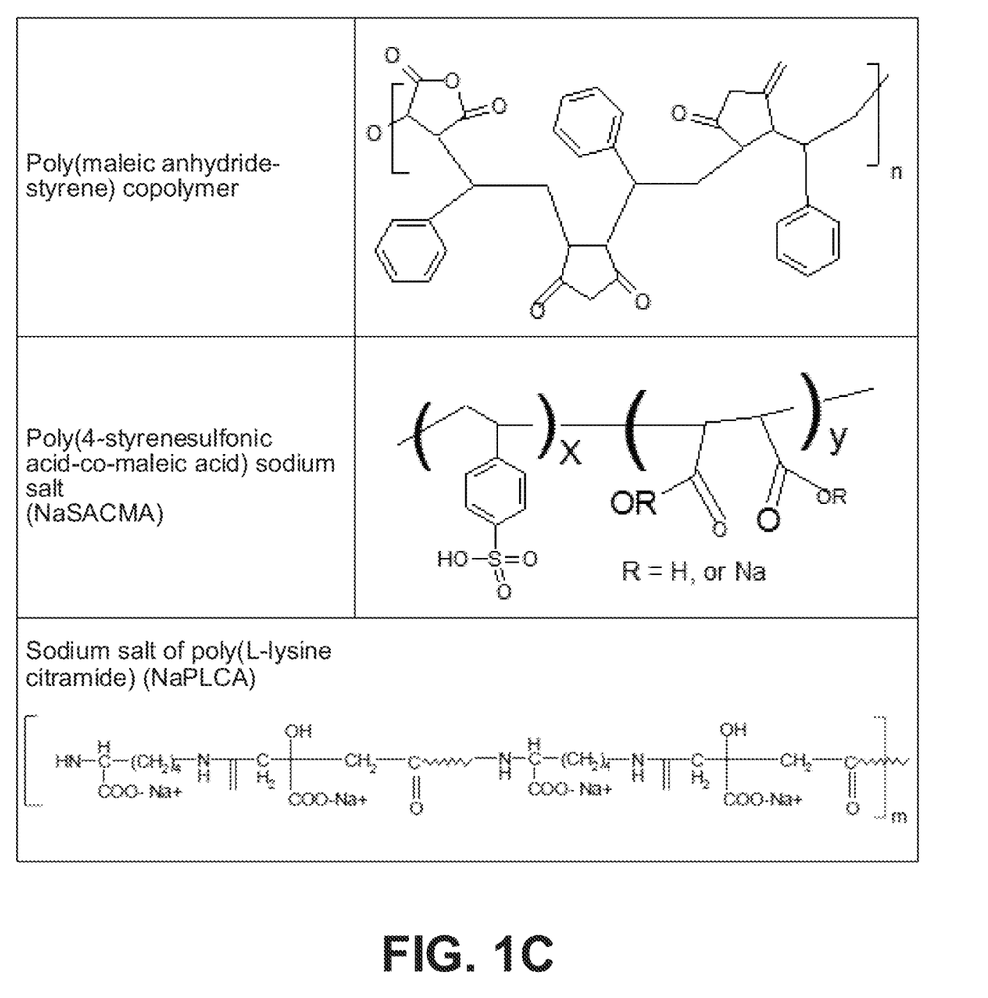

Disclosed herein are flexible, composite conducting polymer films that actuate (i.e., alternately expand and contract) in the presence of humid air. In some embodiments, the composite conducting polymer from which the films are made comprises PPY in combination with one or more water-soluble polyanions. Example water-soluble polyanions that can be used, include sodium p-toluenesulfonate (PTS), poly(styrene p-styrene sulfonate) (PSS), polyvinyl alcohol (PVA), polyacrylic acid (PAA), polyol(pentaerythritol ethoxylate) (PE), polyaniline (PANI), polyethelyne dioxythiophene (PEDOT), poly(dimethyl ammonium chloride) (PDMA), poly(acryl amino methyl propose sulfonate) (PAMPS), sodium salt of polymethacrylic acid (NaPMA), sodium salt of poly(L-lysine citra-mide imide) (NaPLCAI), poly(maleic anhydride-styrene) copolymer, poly(4-styrenesulfonic acid-co-maleic acid) sodium salt (NaSACMA), sodium salt of poly(L-lysine citramide) (NaPLCA), and copolymers thereof. FIG. 1 illustrates the chemical structures of the above-identified polyanions.

One or more of these polyanions can be added to an aqueous solution along with PPY in order to electrochemically synthesize a composite PPY film. In some embodiments, two or three of these polyanions can be combined to form a composite PPY film having highly desirable characteristics. In addition to one or more polyanions, other components can be added to the composite. For example, graphene or a graphene-based material can be added to the aqueous solution. As another example, $MoS_2$ can be added to the aqueous solution. In some embodiments, the synthesized film, irrespective of its composition, can be approximately 20 nm to 10 μm thick.

Various composite conducting polymer films were synthesized and evaluated. Initially, thin PPY films containing one, two, or more polyanions were characterized using Fourier transform infrared spectroscopy (FTIR) and scanning electron microscope (SEM) techniques. The quality of the films was dependent upon the type of polyanion or combinational polyanions present in the composite PPY films. Images were captured of each synthesized film. The composite PPY films containing PAA and PE were found to have shiny surface properties.

The composite PPY films that comprised two or more polyanions were found to alternately contract and expand faster than composite PPY films containing only one polyanion. For example, composite PPY films containing PE+PTS+PAA as well as PVA+PTS+PAA exhibited superior contraction and expansion response with humid air. The composite PPY films synthesized with multiple polyanions were found to be flexible and lustrous (i.e., that state or quality of shinning by reflection of light). When the composite PYY films were undoped, either electrochemically or chemically (NaOH or aqueous ammonia), the films exhibited reduced flexibility.

Figure 2:
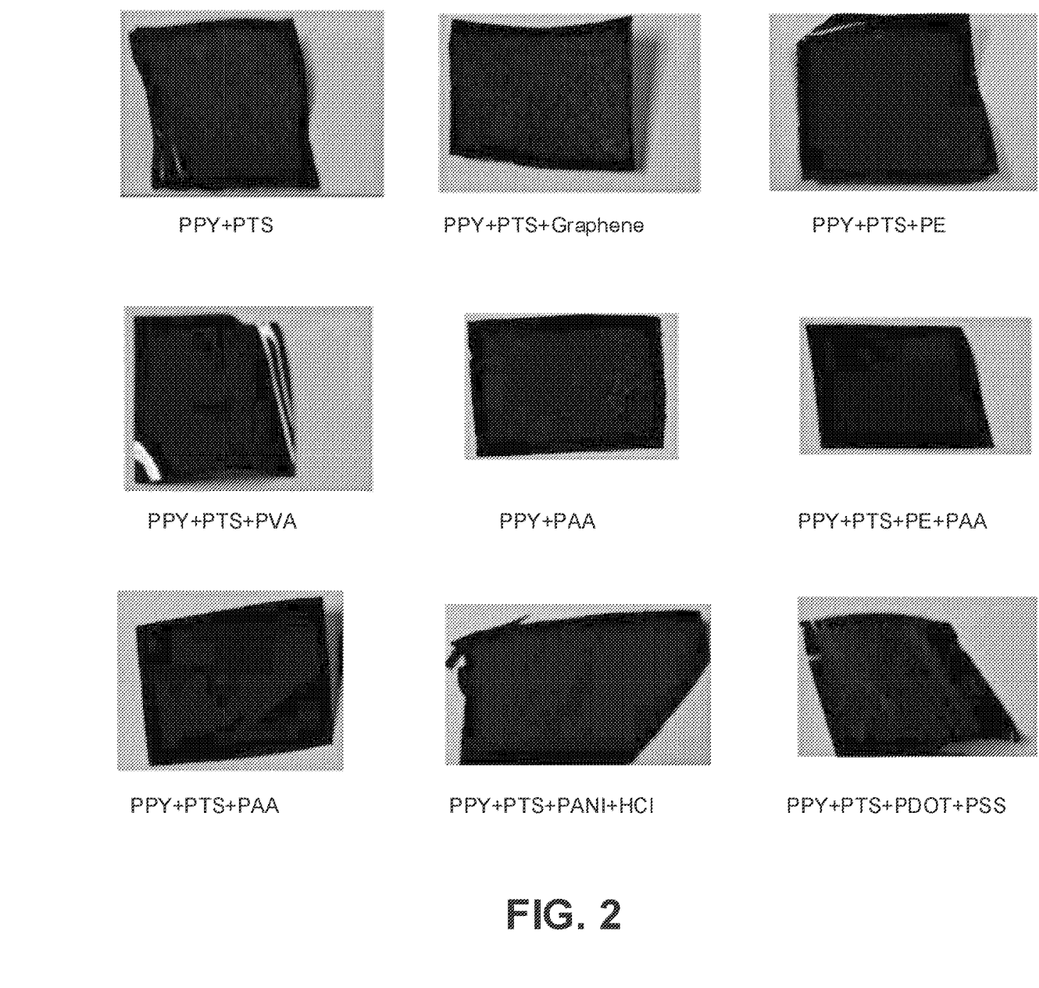
FIG. 2 comprises images of multiple example composite PPY films that were synthesized.
Figure 3:
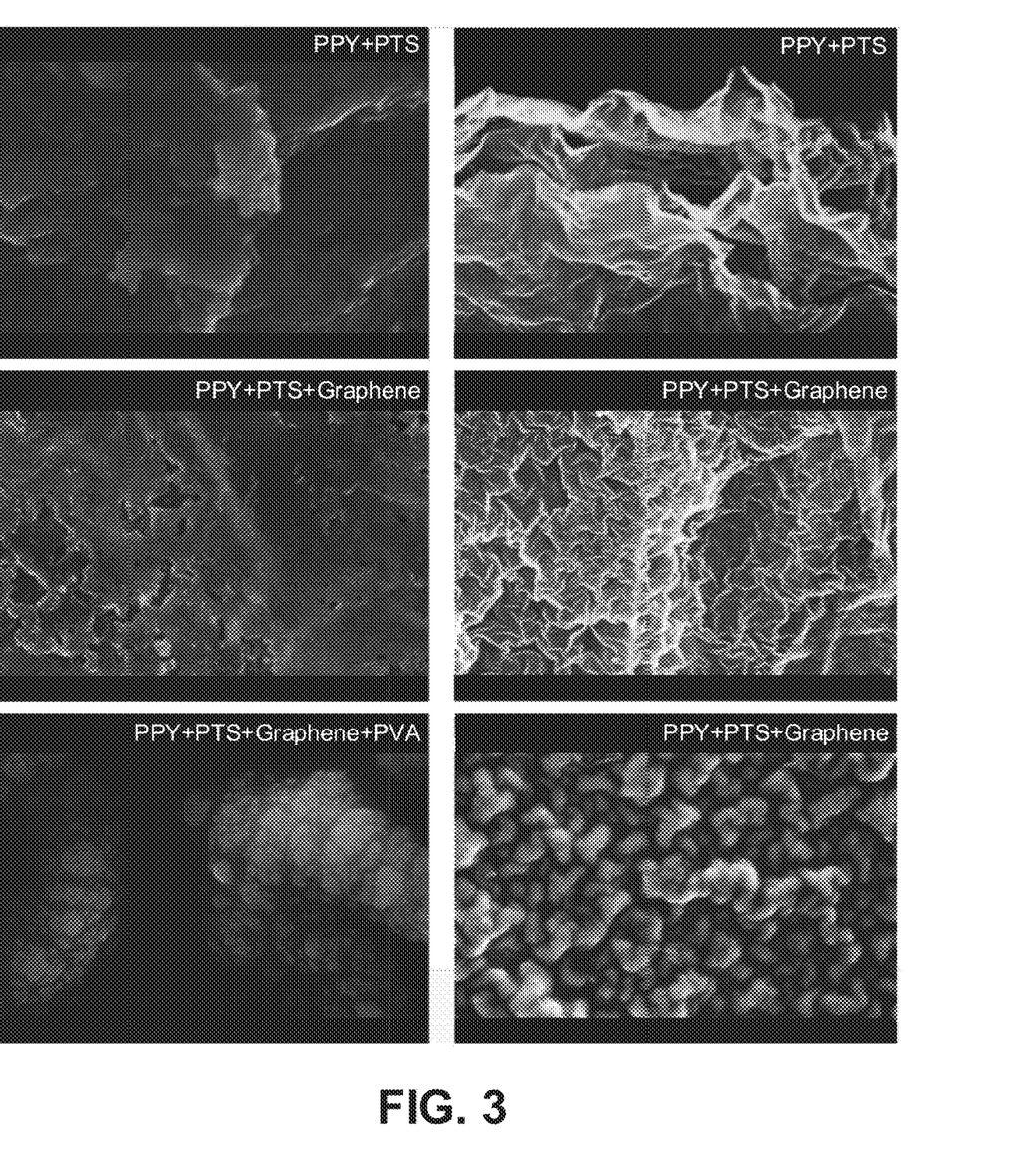
FIG. 3 comprises scanning electron microscope (SEM) images of multiple example composite PPY films that were synthesized.

FIG. 2 shows multiple example composite PPY films that were electrochemically synthesized using an electrolytic polymer. FIG. 3 shows SEM images of composite PPY films made using PTS, PTS+graphene, and PTS+graphene+PVA. The composite PPY films containing PTS exhibited a layered structure, while the composite PPY films containing PTS+graphene exhibited a nano-flake structure due to the presence of the graphene. The presence of PVA changed the pattern, however, and the composite PPY films containing PTS, PVA, and graphene had a rougher surface than composite PPY films containing PTS and graphene. In fact, a cross-linking interpenetrating polymer network was formed in electrochemical systems with film deposited at current density of 10 mA/cm$^2$.

Figure 4:
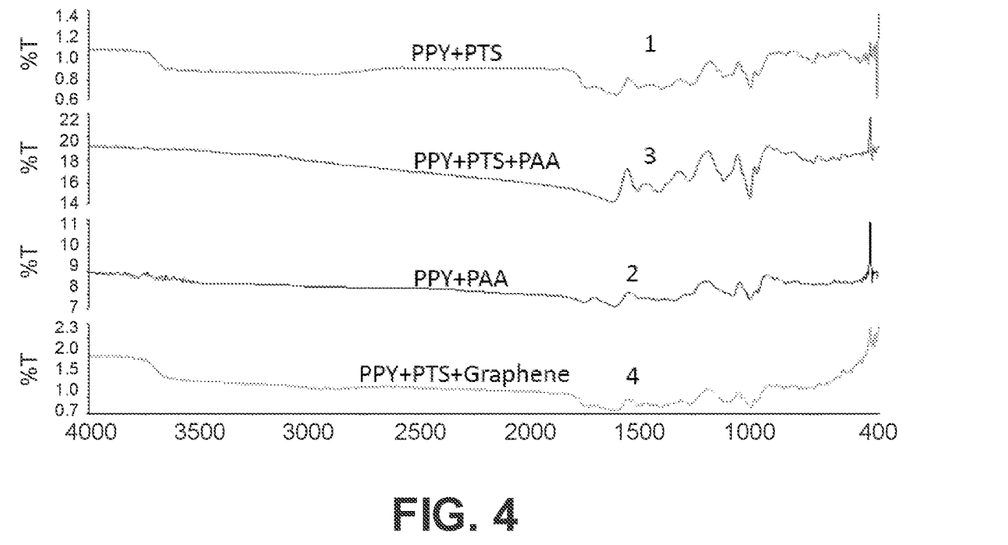
FIG. 4 is a graph that plots Fourier transform infrared spectroscopy (FTIR) spectra of multiple example composite PPY films that were synthesized.

FIG. 4 shows the FTIR spectra of composite PPY polymers that include PTS, PTS+PAA, PAA, and PTS+graphene. The NH vibration at 3400 cm$^{-1}$ is suppressed in the composite PPY film due to the presence of PAA. The stretching vibration at 1560 cm$^{-1}$ and asymmetric vibration at 1430 cm$^{-1}$ resulted from the presence of different anions. The graphene peak of 1760 cm$^{-1}$ is present in the composite PPY film of Curve 4. Characteristic peaks of 1200 cm$^{-1}$ and 840 cm$^{-1}$ are also present in the composite PPY films.

Figure 5A:
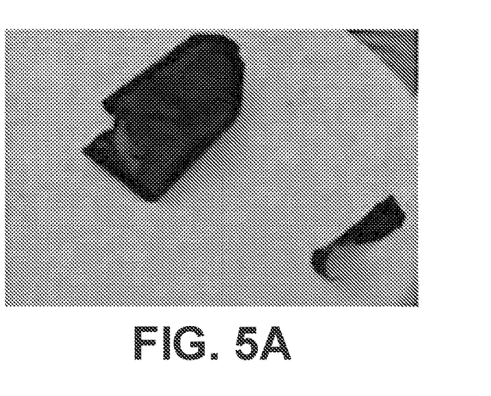
FIG. 5A-5D comprise images illustrating contraction and expansion of self-supported composite PPY films that were synthesized.
Figure 5B:
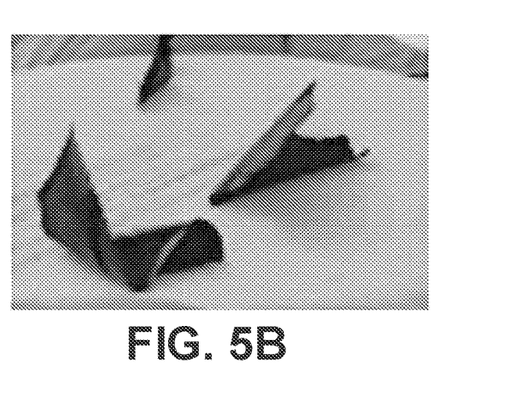
Figure 5C:
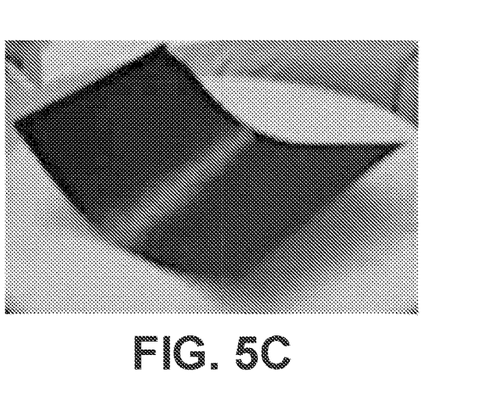
Figure 5D:
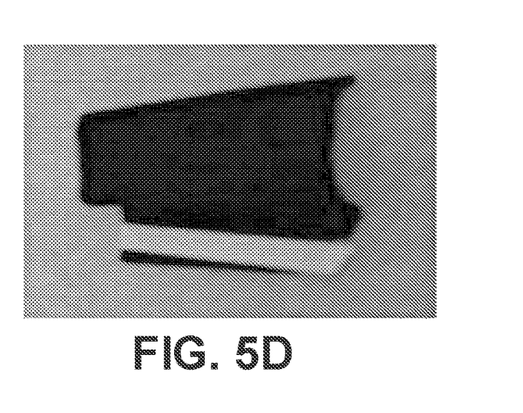

As noted above, the composite PPY films expand and contract in the presence of humid air. This characteristic was tested. Initially, a half-filled beaker containing water was heated to approximately 70 to 90° C. and was covered with filter paper upon which the composite PPY film was placed. FIG. 5 shows alternating contraction and expansion of self-supported composite PPY films. When contracting, the films curl up on themselves. When expanding, the firms uncurl and flatten out. The films shown in FIG. 5 were deposited on a conductive substrate and then removed from the substrate using "transparent" adhesive tape. In FIGS. 5A and 5B, one can observe the contraction and expansion of self-supported PPY+PTS and PPY+PVA films. In FIG. 5C, a composite PPY film adhered to transparent adhesive tape is shown with two of its sides bending upward due to the presence of humid air. In FIG. 5D, a metal weight has been applied to one end of the composite PPY film to hold it in place.

For PPY+PTS films, water molecules are attracted to PTS due to the SO$_3^-$ ions as well as the NH group present in the composite PPY structure. The humid air is subsequently repelled, enabling water molecules to be expelled due to the weak bond of water either with PTS or the NH group of the composite PPY structure.

Figure 6:
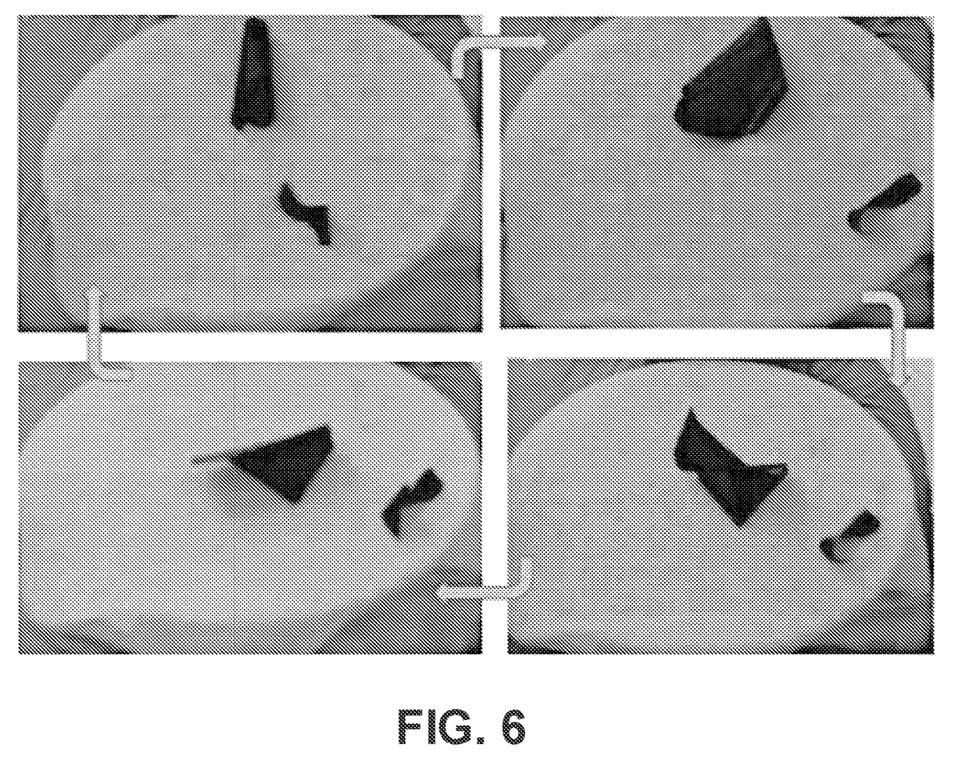
FIG. 6 comprises multiple images extracted from video of a self-supported composite PPY polymer film moving in humid air.
Figure 7:
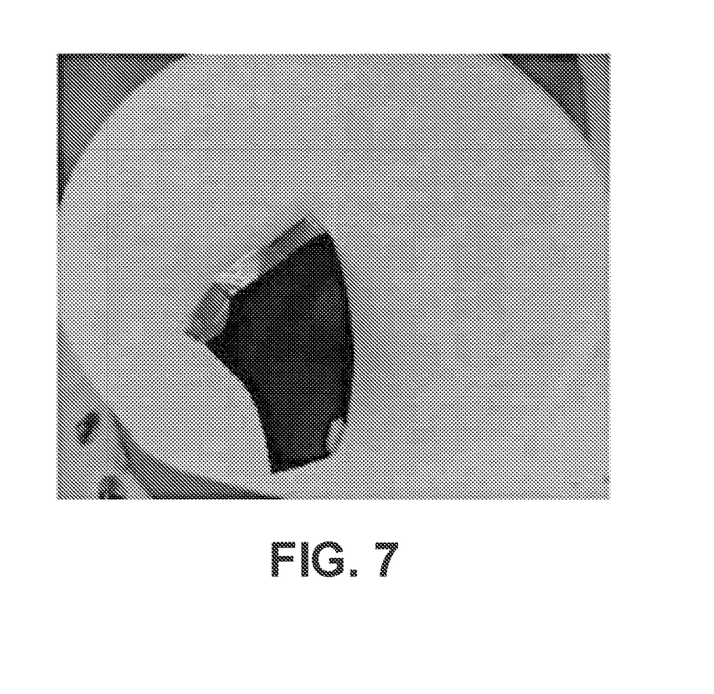
FIG. 7 is an image extracted from video of a self-supported composite PPY film moving in humid air with metal weights applied to the film.

FIG. 6 shows the movement of self-supporting composite PPY+PTS films in the presence of humid air. Water was heated to approximately 70 to 90° C. in a beaker, which was covered by the filter paper. Immediately upon being placed on the filter paper, the composite PPY+PTS composite film randomly moved over the filter paper due to attraction of humid air with NH and sulfonate groups in the composite PPY+PTS polymer. FIG. 7 shows the movement of a PPY+PTS film on transparent adhesive tape in humid air when weights (pieces of metal foil) are applied to two ends of the film. The PPY+PTS film was able to lift the weight due to expansion and contraction in the presence of the humid air.

Figure 8:
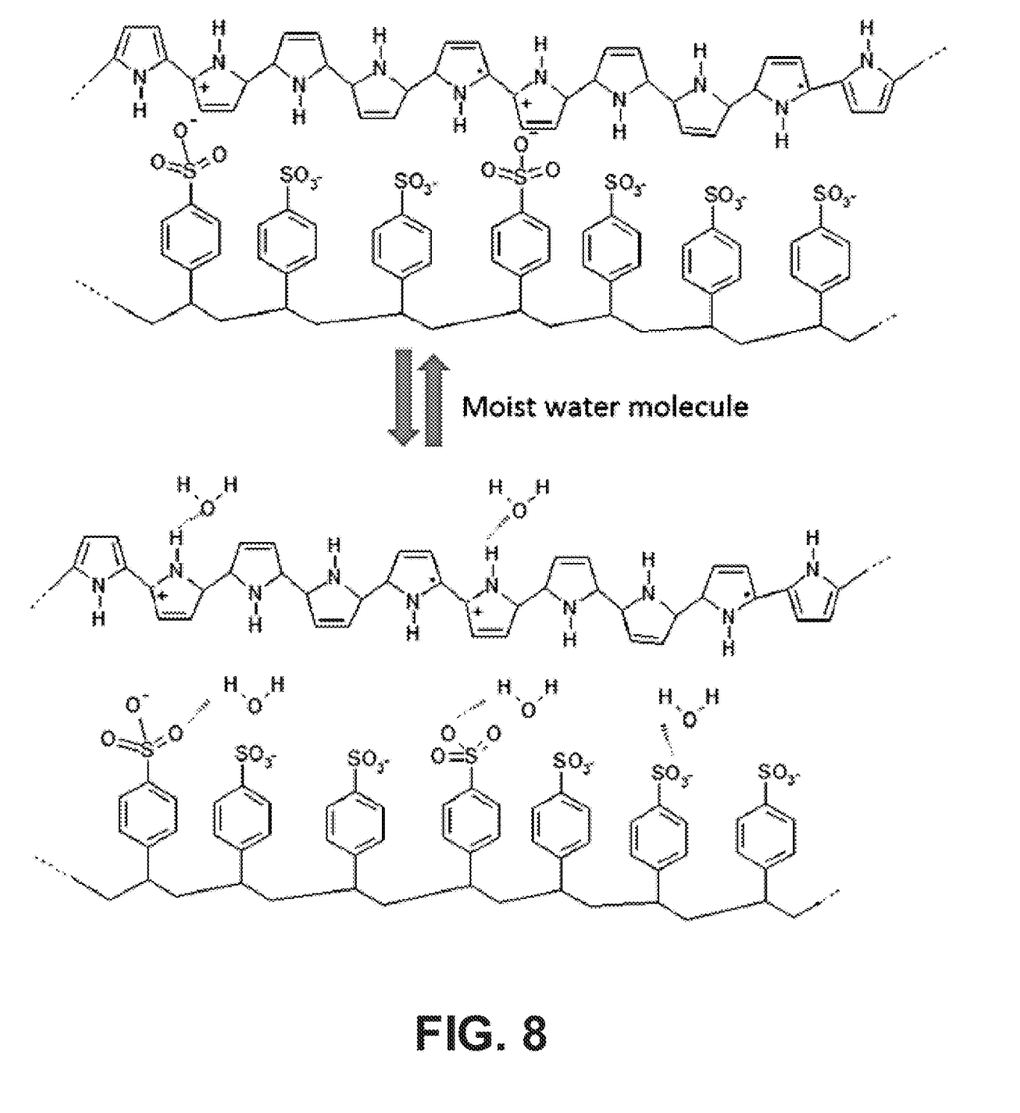
FIG. 8 is a schematic illustration of the mechanism of water attraction and repulsion in a composite PPY (PPY-PTS) film when exposed to humid air.

FIG. 8 illustrates the mechanism of water attraction and repulsion due to humid air in a PPY+PTS film. Water molecules become attracted to the film due to presence of oxygen bonds in the PTS as well as NH groups present in the PPY conducting polymer. The water swells the polymer structure and causes it to expand. When the polymer structure expands, the water molecules are repelled and there is sudden contraction. When such a process occurs, there is an equilibrium formed in which the contraction and expansion is regulated for longer periods of time so that the film has not swelled with the water molecules.

Figure 9:
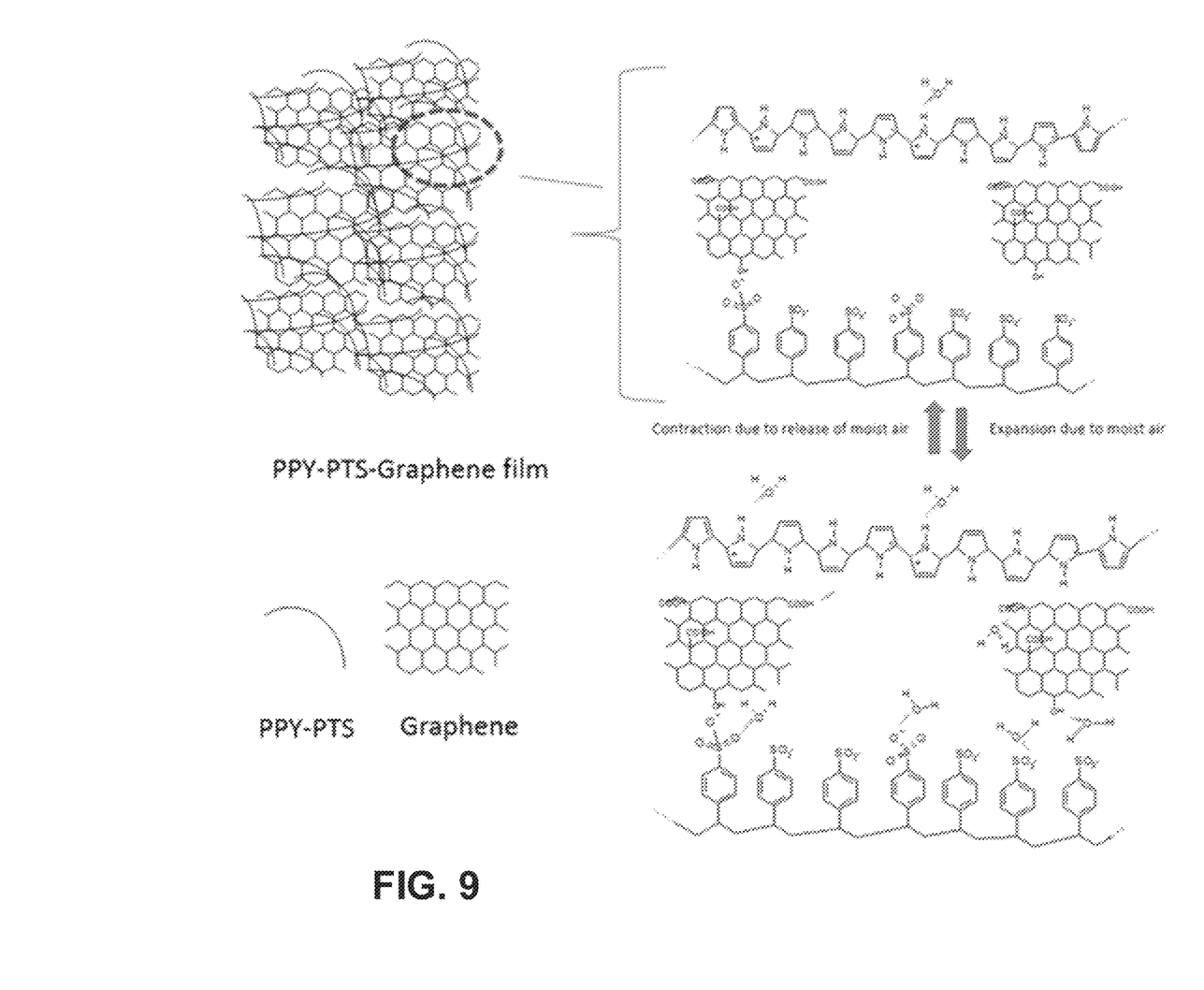
FIG. 9 is a schematic illustration of the mechanism of water attraction and repulsion in a further composite PPY (PPT-PTS-graphene) film when exposed to humid air.
Figure 10:
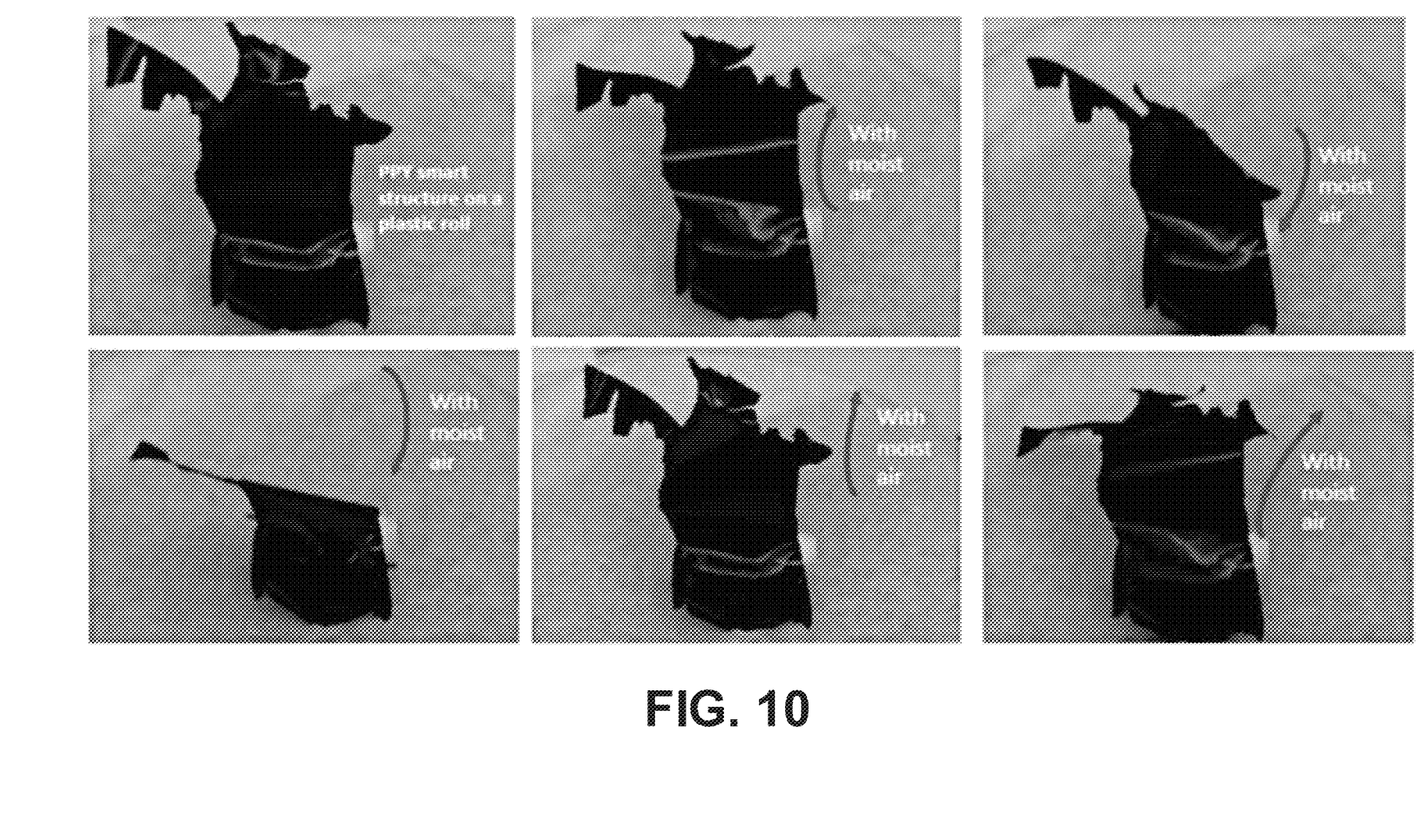
FIG. 10 comprises multiple images of a composite PPY/tape film resting on plastic roll and moving in the presence of humid air.

FIG. 9 illustrates water attraction and repulsion due to humid air in a PPY-PTS-graphene film. Graphene is in an oxidized form when it is polymerized with the pyrrole monomer to produce the composite PPY-PTS-graphene film. Interestingly, the electrochemically synthesized PPY-PTS-graphene film exhibited enhanced contraction and expansion in the presence of humid air. The water molecules easily interact with the —COOH groups besides the oxygen bonds in the PTS. When fabricated using larger current densities (e.g., 5 mA/cm$^2$ and higher), the film easily oxidizes the graphene, revealing the attraction to the water molecules due to the OH as well as the COOH groups.

It can be understood that the PTS and oxidized graphene both have negatively charged oxygen in their structures, which is responsible for the interaction with the water molecules. The electronegativity of oxygen in PTS and oxidized graphene creates the dipole of water molecule where oxygen is electronegative and hydrogen is electropositive creating the weak van der Waal forces between oxygen and water molecules. The presence of the —NH group, which is hydrophilic in nature, also makes for favorable conditions for the water molecules to absorb. The contraction in the film weakens the Van der Waal forces, and water molecules detach. The process repeatedly continues so long as there is a supply of steam. The expansion and contraction can be minimal with the saturation of water molecules to the composite PPY film.

Example Fabrication Methods

Example 1: Composite PPY films were synthesized using an electrochemical cell containing two electrodes. An indium tin oxide (ITO) coated glass plate was used as a working electrode and a platinum mesh was used as a counter electrode. A current density of approximately 1 to 10 mA/cm$^2$ was applied for approximately 1 to 60 minutes to obtain various thicknesses of composite PPY films. It was observed that the films formed using a current density of approximately 10 mA/cm$^2$ exhibited wrinkles and uneven surfaces, whereas films formed using a current density of approximately 1 to 2 mA/cm$^2$ were smooth. In both cases, free-standing, self-supporting flexible films were synthesized by optimizing the time from approximately 30 minutes to 1 hour. The composite PPY films containing PVA, PSS, PAA, graphene, graphene oxide, etc. were electrochemically synthesized in water. The concentration of monomer and different electrolytes used are given below to synthesize the composite PPY films:

1. Pyrrole (0.1M to 1M), PTS (0.5M)
2. Pyrrole (0.1M to 1M), PTS (0.25M), PVA (0.25) to deposit PPY/PVA composite)
3. Pyrrole (0.1M to 1M), PVA (0.25M), PTS (0.25)
4. Pyrrole (0.1M to 1M), PTS (0.25M), graphene (1/10th ratio of monomer) to deposit graphene (SG) and PPY (PPY)
5. Pyrrole (0.1M to 1M), PTS (0.25M), PAA (0.25)
6. Pyrrole (0.1M to 1M), PE (0.1-0.50 M
7. Pyrrole (0.1M to 1M), PTS (0.1 to 0.5M), removed to scotch (time of deposition was 1 minutes to 20 minutes)
8. Pyrrole (0.1M to 1M), PTS (0.25M), PAA (0.25M) layer
9. Pyrrole+PTS (0.1 to 0.5M) and layer of PEDOT+PSS over using EDOT (0.1M)+PSS (2 mg/ml)+PTS (0.25M)

Example 2: Composite PPY films were electrolytically deposited on ITO or metal substrates using an aqueous solution containing pyrrole monomer and various polyanions or other materials in deionized water. The composite PPY film was deposited with a current density of approximately 1 to 10 mA/cm$^2$ for approximately 1 to 30 minutes on ITO-coated glass, or platinum or steel substrates. The composite PPY film was then removed from its substrate by simply placing adhesive tape (transparent or metal adhesive tape) over the film. Once removed, the composite PPY film was prepared to be transferred to other substrates.

Example 3: A solution of 0.2M aniline and 1M HCl was used to deposit a PANI film on a PPY/ITO substrate. The PANI film was deposited in an electrochemical cell comprising the PPY/ITO substrate as the working electrode and a steel plate as the counter electrode at a potential of 1.2 V. The PANI film was washed with water and kept dry using nitrogen gas or by simply blowing air over it. Once it was apparent that there was no visible water on the film, the film was covered by flexible, transparent adhesive tape. The upper surface of the tape was rubbed gently to remove any air trapped between the film and the tape. Attempts were also made to remove the air using a vacuum pump while the sample was sitting in a vacuum oven. The composite PPY/PANI film was then removed from the surface. FIG. 5 shows the PPY/PANI film on the transparent adhesive tape.

Similarly, PEDOT+PSS was electrochemically deposited over composite PPY in a water solution containing EDOT monomer and PSS electrolyte. A current density of approximately 2 mA/cm$^2$ was applied for approximately 30 minutes to deposit a PEDOT film over composite PPY surface. The composite PPY/PEDOT film was removed from the transparent adhesive tape.

Example 4: PPY+PTS+MoS$_2$ films were synthesized at current density of 1-10 mA/cm$^2$ for 1-60 minutes to obtain various thicknesses of composite conducting polymer films. The solution for electrochemical deposition was maintained using pyrrole (0.1M to 1M), PTS (0.25M), and MoS$_2$ (1 to 1/10$^{th}$ ratio of pyrrole monomer). The MoS$_2$ is hydrophobic material so nearly 0.05 gm of cationic surfactant, cetyltrimethylammonium bromide (CTAB) was used to homogenously disperse the MoS$_2$ in electrochemical solution.

Attempts were made to understand the expansion and contraction of the composite PPY+PTS+MoS$_2$ films due to humid air. Water molecules become attracted to the oxygen bond in PTS as well as the NH group present in composite PPY conducting polymer. The humid air swells the polymer structure and enables it to contract. Because the MoS$_2$ is hydrophobic, it enables expulsion of the water molecules and enhances the expansion and contraction process in the composite conducting polymer film.

Applications:

As mentioned above, the composite conducting polymers of the present disclosure can be used in various applications. One such application is humidity sensors. In particular, composite conducting polymer films can be used to form electrical switches that that can be actuated by a threshold humidity within the ambient air or gas.

Figure 11A:
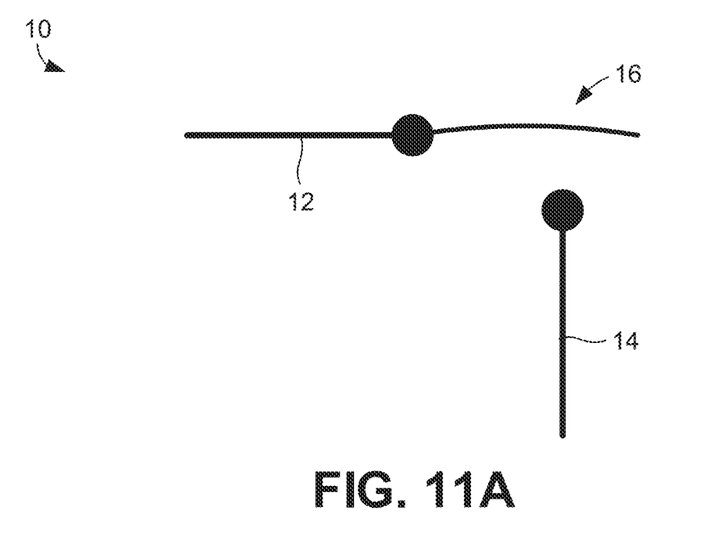
FIGS. 11A and 11B schematically depict an electrical switch comprising a composite conducting polymer film.
Figure 11B:
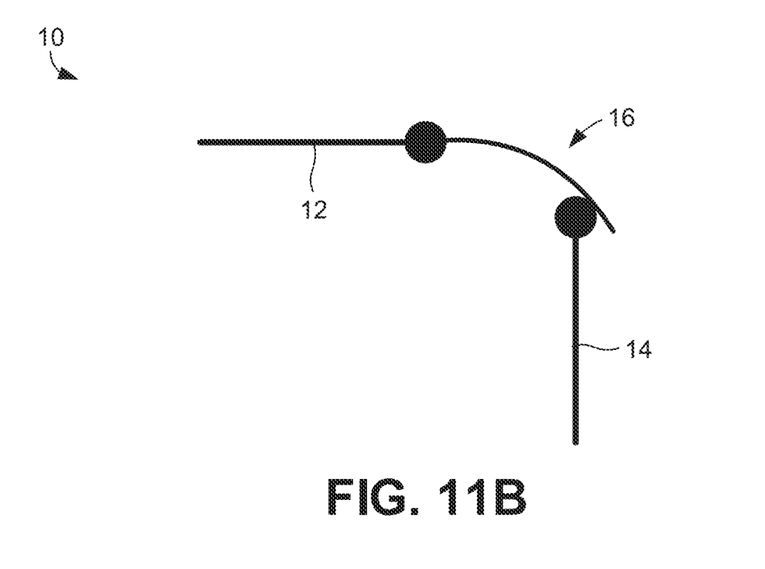

FIGS. 11A and 11B illustrate such an application. As shown in these figures, an electrical switch 10 of an electrical circuit, which may comprise part of a humidity sensor, comprises a first electrical conductor 12, a second electrical conductor 14, and a composite conducting polymer film 16 that is coupled (e.g., attached) to the first electrical conductor. In a first state of the switch 10 shown in FIG. 11A, the film 16 does not make contact with the second electrical conductor 14, in which case the circuit is open. This state can, for example, be associated with a humidity level in the ambient environment below a threshold of a humidity sensor. In a second state of the switch 10 shown in FIG. 11B, the film 16 has contracted (curled inward), for example, in response to the humidity in the ambient environment reaching or exceeding the threshold, and therefore makes contact with the second electrical conductor 14, in which case the circuit is closed. When the ambient humidity falls below the threshold, the film 16 can return to its initial state shown in FIG. 11A (open circuit). Accordingly, the state of the switch 10 can be correlated to a humidity level by the humidity sensor.

In the humidity sensor application, the composition and/or properties of the composite conducting polymer film 16 can be tailored to ensure actuation of the film at the desired humidity level.

The invention claimed is:

1. A method of forming a composite polymer film, the method comprising:
    forming an aqueous solution containing pyrrole monomers and one or more water-soluble polyanions that function as an electrolyte, the one or more water-soluble polyanions being selected from the group including one or more of poly(sodium para toluene sulfonate) (PTS), poly(styrene p-styrene sulfonate) (PSS), polyvinyl alcohol (PVA), polyacrylic acid (PAA), polyol(pentaerythritol ethoxylate) (PE), polyaniline (PANI), polyethylene dioxythiophene (PEDOT), poly(dimethyl ammonium chloride) (PDMA), poly (acryl amino methyl propose sulfonate) (PAMPS), sodium salt of polymethacrylic acid (NaPMA), sodium salt of poly(L-lysine citra-mide imide) (NaPLCAI), poly(maleic anhydride-styrene) copolymer, poly(4-styrenesulfonic acid-co-maleic acid) sodium salt (Na-SACMA), sodium salt of poly(L-lysine citramide) (NaPLCA), and copolymers thereof, wherein the solution comprises no non-aqueous solvents and no other electrolytes;
    providing the aqueous solution in an electrochemical cell;
    providing a working electrode and a counter electrode within the aqueous solution in the electrochemical cell;
    applying a current to the aqueous solution so as to electrochemically deposit a composite polypyrrole film on the working electrode that comprises the polypyrrole and the one or more water-soluble polyanions; and
    transferring the composite polypyrrole film from the working electrode to a piece of adhesive tape.

2. The method of claim 1, wherein the aqueous solution contains at least two water-soluble polyanions.

3. The method of claim 1, wherein the aqueous solution further contains graphene and the composite polymer film is a composite of polypyrrole, the one or more water-soluble polyanions, and graphene.

4. The method of claim 1, wherein the aqueous solution further contains molybdenum disulfide ($MoS_2$) and the composite polymer film is a composite of polypyrrole, the one or more water-soluble polyanions, and $MoS_2$.

5. The method of claim 1, wherein the composite polypyrrole film has a thickness of approximately 20 nanometers to 10 microns.

6. The method of claim 1, wherein the aqueous solution further contains a second conducting polymer and the composite polymer film is a composite of polypyrrole, the second conducting polymer, and the one or more water-soluble polyanions.

7. The method of claim 6, wherein the second conducting polymer is polyaniline (PANI).

8. The method of claim 6, wherein the second conducting polymer is poly(3,4-ethylenedioxythiophene) (PEDOT).

9. The method of claim 1, wherein applying a current to the aqueous solution comprises applying the current to the aqueous solution at a current density of approximately 1 to 10 $mA/cm^2$.

10. The method of claim 9, applying a current to the aqueous solution comprises applying the current to the aqueous solution for approximately 1 to 60 minutes.

\* \* \* \* \*